(12) United States Patent
Quere et al.

(10) Patent No.: US 8,176,522 B2
(45) Date of Patent: May 8, 2012

(54) METHOD FOR RECOVERING A VIDEO-ON-DEMAND SESSION

(75) Inventors: Thierry Quere, Monfort sur Meu (FR); Duncan Lamb, Rennes (FR); Jean-François Lagardere, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 526 days.

(21) Appl. No.: 11/978,705

(22) Filed: Oct. 29, 2007

(65) Prior Publication Data

US 2009/0070471 A1    Mar. 12, 2009

(30) Foreign Application Priority Data

Oct. 30, 2006  (FR) ...................................... 06 54621

(51) Int. Cl.
*H04N 7/173* (2006.01)
(52) U.S. Cl. ................ 725/90; 725/91; 725/93
(58) Field of Classification Search .......................... None
See application file for complete search history.

(56) References Cited

U.S. PATENT DOCUMENTS

| 6,598,229 | B2* | 7/2003 | Smyth et al. ................... 725/107 |
| 6,910,078 | B1 | 6/2005 | Raman et al. |
| 7,043,749 | B1 | 5/2006 | Davies |
| 2003/0236905 | A1* | 12/2003 | Choi et al. ..................... 709/231 |
| 2007/0076728 | A1* | 4/2007 | Rieger et al. ................... 370/401 |

OTHER PUBLICATIONS

French Search Report dated May 22, 2007.

* cited by examiner

*Primary Examiner* — Kristine Kincaid
*Assistant Examiner* — Chenea Smith
(74) *Attorney, Agent, or Firm* — Tutunjian & Bitetto, P.C.

(57) ABSTRACT

The present invention relates to a method for recovering a downloading section that has been interrupted, in a device comprising an interface with a network enabling access to a remote server and means for implementing a downloading session with the said server, comprising the steps for starting up a downloading session of a content from the remote server, by means of more than one signalling channel with at least the said server, detecting a premature interruption of the downloading session, verifying the availability of all the channels, as long as one of the channels is unavailable, the session is not recovered and when all the channels are again available, the session is recovered.

5 Claims, 4 Drawing Sheets

METHOD FOR RECOVERING A VIDEO-ON-DEMAND SESSION

This application claims the benefit, under 35 U.S.C. §119 of French Patent Application 0654621, filed Oct. 30, 2006.

FIELD OF THE INVENTION

The present invention relates to a method for recovering a video-on-demand session.

BACKGROUND OF THE INVENTION

The bit-rates authorised by the digital subscriber line noted as DSL, enable high bit-rate services to be implemented. Good quality video services can thus reach the subscriber. DSL can distribute the video broadcast service, known as broadcast mode. DSL can also, owing to the possibility of using a return channel from the subscriber to the content broadcaster, allow interactive services to be set up. Video-on-demand services, noted as VoD, are thus offered to the subscriber. This involves providing a panel of videos that the subscriber can download from a content server and view on demand. Depending on the services proposed, the subscriber can view the video as is it being downloaded, in streaming mode. In this case, the video is viewed once and is not stored in the memory. According to another type of service, the subscriber can download and store the video in memory to view it subsequently one or more times, or keep it. Generally, an acknowledgement by the subscriber occurs both at the start to begin downloading and at the end of the download operation to validate the viewing of the video and subsequently leading to the payment of the service.

On the subscriber side, the video can be consulted on a computer screen. It can also be consulted on a television screen. This requires connecting the television set to a set-top box. Generally, the set-top box is connected to a modem that offers access to the VoD server via the Internet network. The set-top box can be connected to the modem by means of an Ethernet cable.

When an interruption in the VoD service occurs, the server implements a recovery on error mechanism. It uses commands of the Simple Network Management Protocol type, noted as SNMP, to restart the VoD session. This mechanism is enabled during a relatively short period that can be for example a maximum of two minutes. Beyond this period the error recovery mechanism stops; the delivery of the VoD has failed, the invoicing will be cancelled.

During the error recovery mechanism, the set-top box can switch to a back-up mode, for example by providing an access only to the reception of broadcasted video. When it receives an SNMP command from the server to recover the VoD service, it switches to VoD mode. If the VoD service is unavailable, it switches back to back-up mode. This start up operation can often lead to oscillations of the system between the broadcast video reception mode and the VoD mode.

To prevent such oscillation, one method consists of ignoring the SNMP commands. But the STB then remains in back-up mode, and cannot return to VoD mode.

SUMMARY OF THE INVENTION

The present invention relates to a method for recovering a downloading section that has been interrupted, in a device comprising an interface with a network enabling access to a remote server and means for implementing a downloading session with the server.

For this purpose, the invention defines a method comprising the steps for starting up a downloading session of a content from the remote server, by means of more than one signalling channel with at least the said server, detecting a premature interruption of the downloading session, verifying the availability of all the channels, as long as one of the channels is unavailable, the session is not recovered and when all the channels are again available, the session is recovered.

The session is automatically recovered in the STB. The user of the STB does not have to intervene during the session recovery method. The STB checks that all the channels are operational before accepting the recovery of the session. This enables the oscillations due to recoveries of the session to be avoided when all the channels are not operational.

According to one embodiment, the session recovery step is performed by a response to a session recovery request coming from the server.

When the channels are operational, the device responds to the requests of the server to recover the session. The server sends requests continually.

According to another embodiment, the session recovery step is performed by sending a session recovery request to the server.

When the channels are operational, the device asks the server to recover the session.

In one embodiment the session is a video-on-demand session.

The invention also relates to a computer program product, characterised in that it comprises program code instructions for executing the steps of the aforementioned method when the said program is run on a computer. "Computer program product" is understood to mean a computer program medium that can consist not only in a storage space containing the program, such as a diskette or cassette, but also a signal, such as an electrical or optical signal.

BRIEF DESCRIPTION OF THE DRAWINGS

The invention will be better understood and illustrated by means of the following embodiments and implementations, by no means limiting, with reference to the figures attached in the appendix, in which.

DETAILED DESCRIPTION OF PREFERRED EMBODIMENTS

Figure 1:
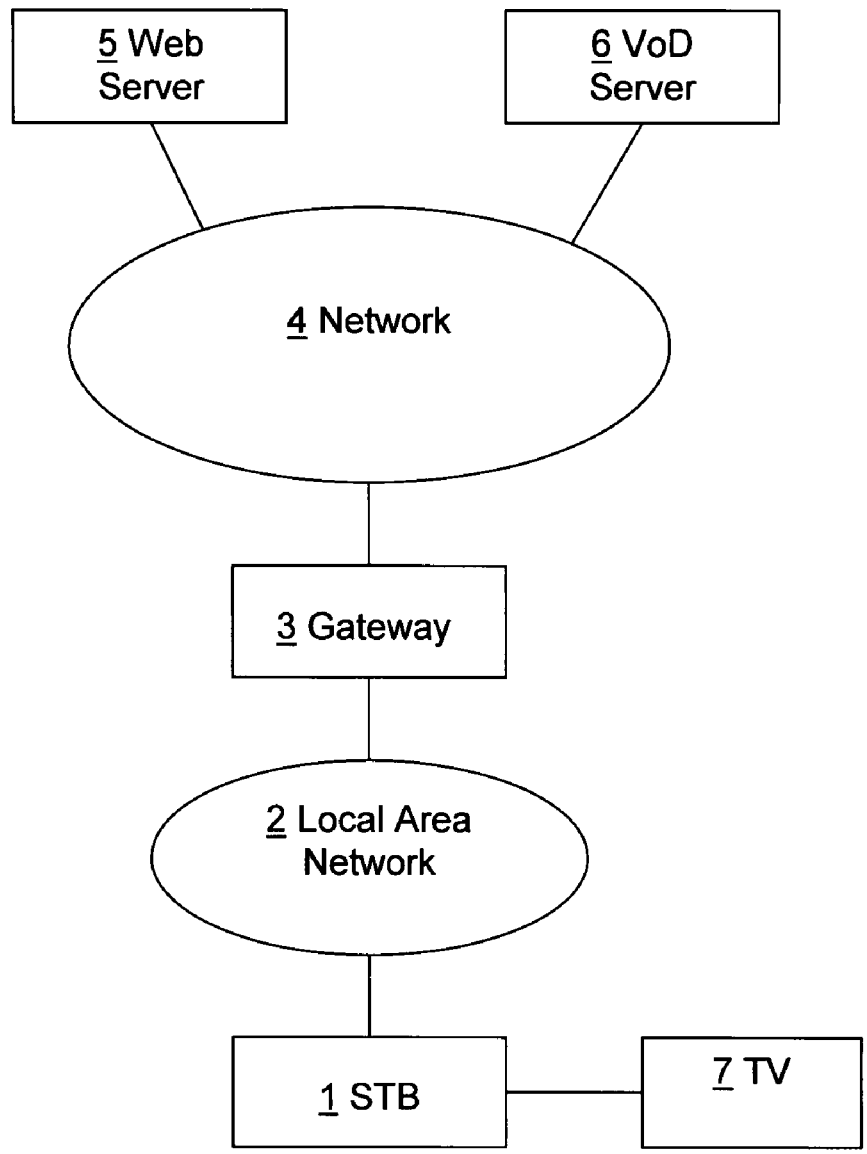
FIG. 1 shows the video-on-demand system according to the embodiment.
Figure 2:
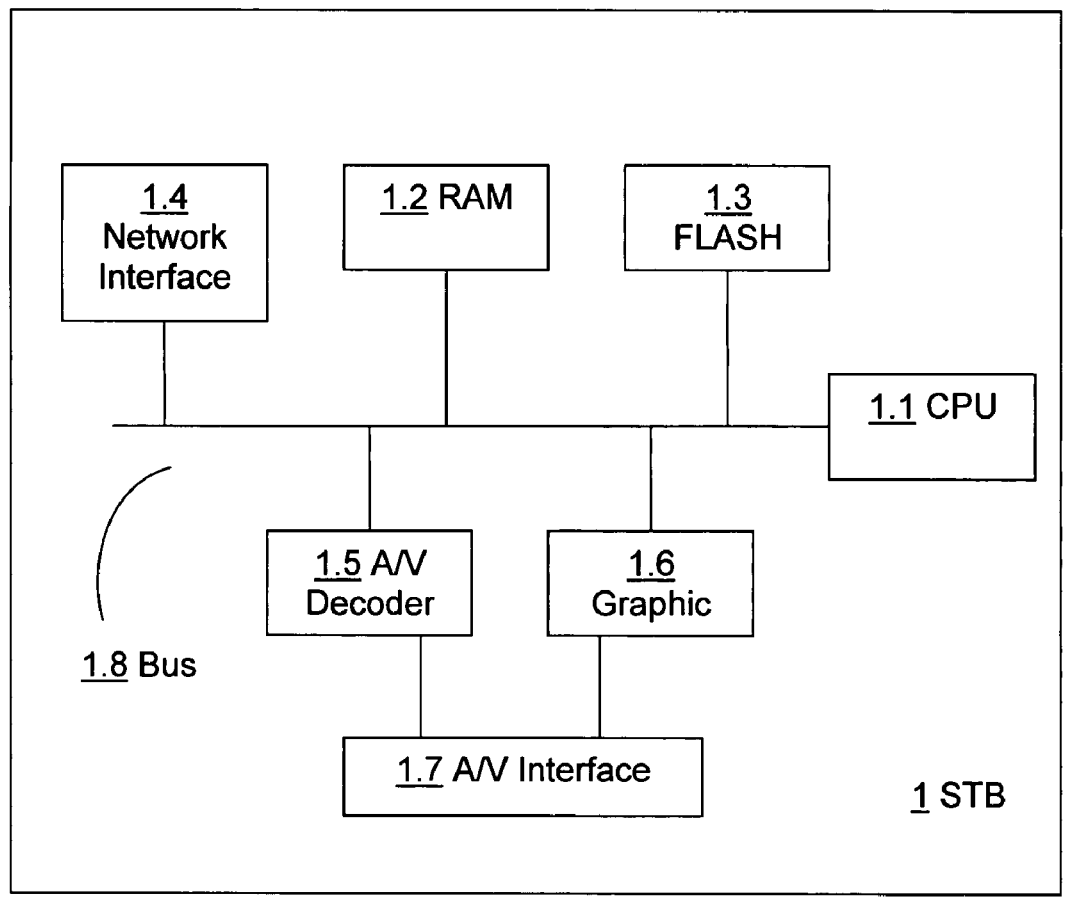
FIG. 2 shows the hardware architecture of the set-top-box.

In FIGS. 1 and 2, the modules shown are functional units that may or may not correspond to physically distinguishable units. For example, these modules or some of them can be grouped together in a single component, or constitute functions of the same software. On the contrary, some modules may be composed of separate physical entities.

In a normal operating mode, the STB provides a set of interactive services of which VoD is a part. The main elements of a system providing a VoD service are shown in FIG. 1. The set-top box 1, noted as STB in the rest of the document, is connected to a gateway 3 by means of a local area network 2. The local area network is an Ethernet network and can also be another type of wired network, or also a wireless LAN. The network can also limit itself to an Ethernet point-to-point link, as in the embodiment. STB 1 comprises an interface to a television screen 7.

Gateway 3 connects the local area network 2 to an Internet network 4 which is connected to the servers enabling the VoD service to be provided for the subscribers. Different client-server functions are required to set up the VoD service. They are functions such as Hyper Text Transfer Protocol noted as HTTP, Real Time Streaming Protocol noted as RTSP, Dynamic Host Configuration Protocol noted as DHCP, and Simple Network Management Protocol noted as SNMP. Two servers 5, 6 are shown in FIG. 1, an HTTP server 5 and an RTSP server 6, also called a VoD server. The servers can naturally be included in a single item of equipment or in separate items of equipment that can be located in separate parts of the network. Among other things, the HTTP server provides the user interfaces in the form of Hyper Text Markup Language pages, noted as HTML, for the client.

The essential parts of the STB 1 with regard to the VoD service are shown in FIG. 2. The STB comprises a network interface 1.4, which is an Ethernet type interface in the embodiment. It comprises a memory of the Random Access Memory type, noted as RAM 1.2 corresponding to the main memory, and a secondary memory of the Flash type 1.3, that can store data even when the device is no longer powered up. The STB also includes a central processor 1.1. The audio-video decoder 1.5 and the graphical user interface 1.6 prepare the content that is sent to a screen by means of the audio-video interface. The data travels between the different modules via an internal bus 1.8.

Figure 3:
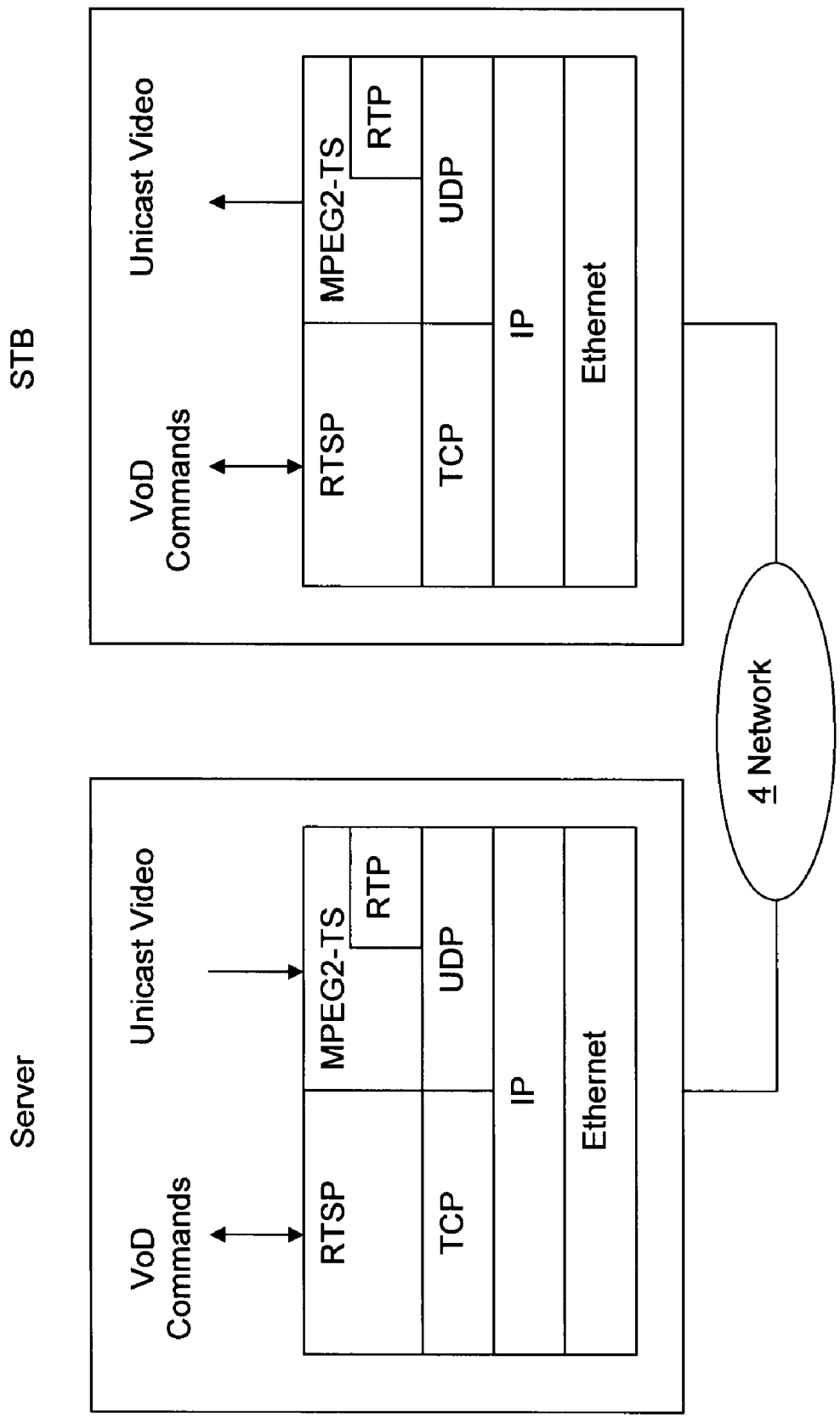
FIG. 3 shows the protocol layers used.

FIG. 3 shows the protocol layers used within the framework of the VoD service between the client STB and the server applications. In general, the VoD services are based on the set up of several signalling channels.

An HTTP type session processes the user commands. The HTTP server provides a user interface to the client in the form of pages in HTML format. The user interface offers the client various functions. This includes the choice of the film, acknowledgement of the ticket at the start of the session, the content display commands such as: Fast forward, Fast rewind, Pause, Play, ticket acknowledgement at the end of the VoD session. The viewing of the VoD is justified by the subscriber on the one hand with the acknowledgement of the entrance ticket for starting the VoD, and on the other with the acknowledgement of the ///exit ticket to confirm that the session has finished. The operator uses these acknowledgments to ensure that the VoD session has been correctly performed. It also allows the operator to proceed with the invoicing.

An RTSP type session is used to control the VoD server according to user requests. RTSP can control the broadcast of the streaming flow.

A control protocol and remote notifications, based for example on the SNMP protocol can be used to control the VoD service. These are commands of the 'start VoD' type and notifications of the 'VoD started', 'VoD finished', 'VoD disturbed' service type, etc.

An access control mechanism is used to control the service access authorizations.

An IP connection implementing UDP is used to transport the useful data of the audio, video, subtitles type, etc.

Figure 4:
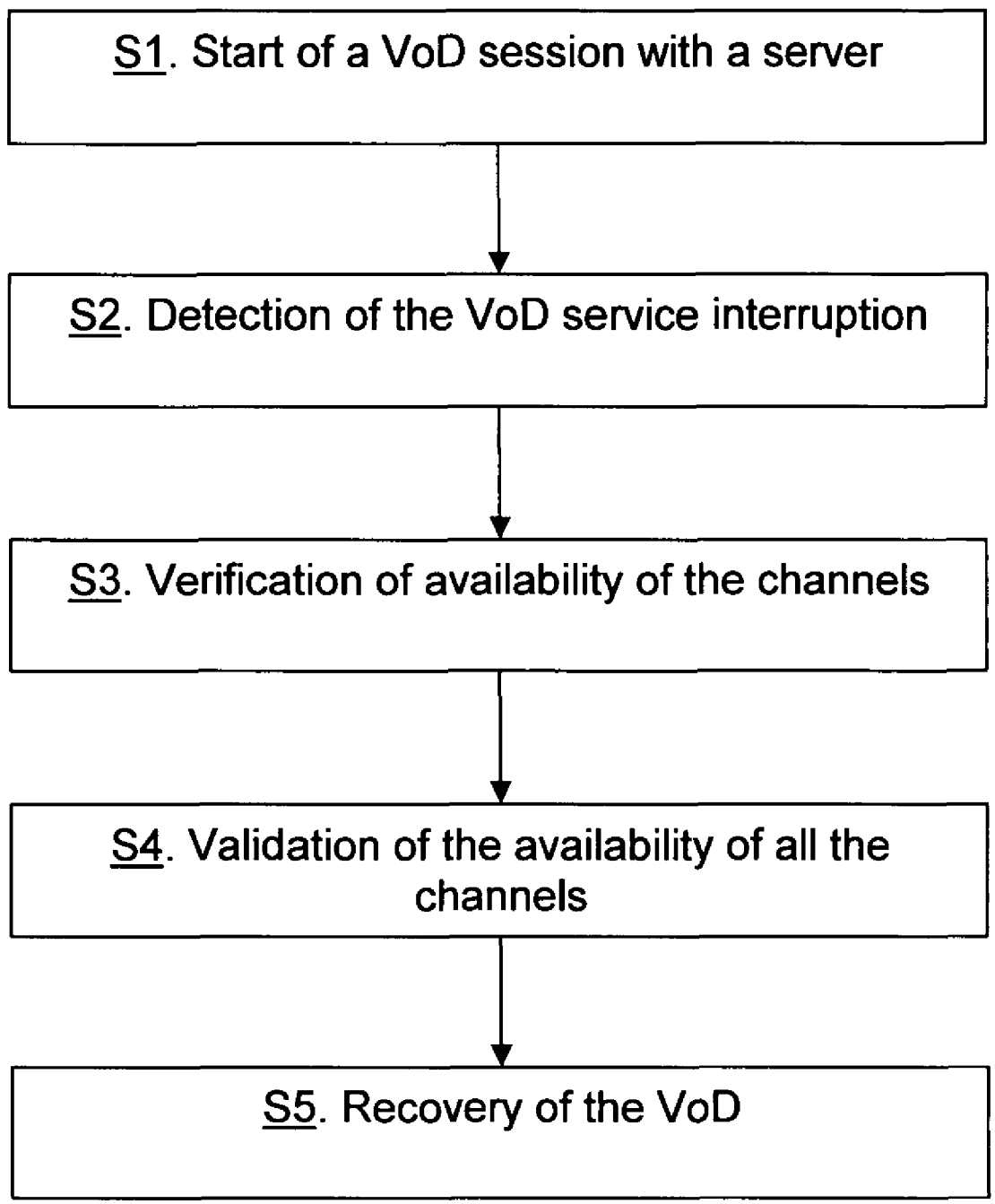
FIG. 4 shows the steps of the method according to the invention.

The recovery steps of the VoD session are indicated in FIG. 4. The STB starts a VoD session with a VoD server, step S1. It is in the 'normal' operating state. When the HTTP connection is faulty, step S2, the failure being due to the unavailability of the WEB server or to a loss of connection with the VoD server, the VoD service is interrupted, together with all of the interactive services. The STB detects the interruption in the HTTP connection and also the interruption in the VoD service. It then exits the normal operating mode and switches to a secondary operating mode, also known as 'degraded mode'. In other words, the STB switches to a 'secondary' state. A local application, that is integrated into the device, is automatically started up in the STB to run this mode. The application opens an embedded HTML page that proposes a simplified menu with respect to the standard menu. The embedded user interface does not require a connection to a WEB server. The secondary mode mainly offers the possibility of receiving and selecting one channel among the channels broadcast. Each channel corresponds to a multicast IP address, and the choice of a channel is made by registering with the corresponding multicast group according to a mechanism well known in itself. As the WEB server is unavailable, the IP services such as the consultation of programmes or downloading are not accessible in this mode. Naturally, the interruption of VoD service can be due to other causes such as a failure of one of the RTSP, SNMP or Access Control channels. It can also be interrupted owing to a failure of the VoD server, due to missing MPEG data, or to a break in the link between the STB and the server, due for example to network maintenance by the network operator.

At the same time, the VoD server tries to recover the download operation. It sends SNMP type requests to the STB. The STB ignores the request so as to prevent oscillations between degraded mode and standard mode operation. Indeed, if the STB accepts the request, it switches back to standard mode; however, if the WEB server is unavailable the VoD service cannot recover and the STB then returns to degraded mode. The fact that the STB accepts each request creates switching back and forth between the standard mode and the degraded mode. By ignoring these requests, the STB remains in degraded mode, with a stability of service for the user.

In the degraded mode, the STB attempts to recover the connection with the VoD server, step S3. It checks whether all the channels necessary for enabling the VoD have become operational again. It uses a ping type strategy. This principle involves opening a connection, also known as a socket, between the STB and the VoD server for each channel used and sending information over this connection to check the availability of the server on these channels. Naturally, a minimum of information is sent so as not to congest the network unnecessarily. Then, according to the presence or absence of a response, the STB can decide on the availability or unavailability of the targeted server.

In the case of the HTTP channel, the request consists of using a GET HTTP command on a nonexistent file from the root of the WEB server. If the server is available, it responds with an error message to the STB. Normally, the response of the server must be "error 404 (File not found)". If the server is unavailable, the STB will not receive any response.

In the case of the RTSP channel, the request consists of using a get_parameter on an RTSP connection unknown by the server. If the server is available, then the response from the server must be of the type "socket unknown". Otherwise, the STB does not receive any response.

Concerning the SNMP channel, the test consists of sending an SNMP message with an incorrect identifier, called object identifier, of the Management Information Base, noted as MIB. The MIB contains the list of attributes that must be supported by the SNMP agent of the STB. If the server is available, it returns an error message.

Concerning the Access Control channel, the test consists of opening a TCP session with the server, and sending one byte of any data. If the server sends back an authentication error message, this means that the channel is indeed active.

At the same time the STB avoids sending other types of requests on these channels knowing that they are unavailable. This prevents the network from becoming congested.

Once the channels probed by the STB have become operational again, step S4, that is each request on each channel is positive, the STB recovers the downloading session. According to the embodiment, the STB accepts the SNMP request coming from the VoD server, step S5. Namely, that the STB switches to the 'resume' state. The VoD service can then resume and the STB return to normal mode.

Another possible means of recovering the downloading session is to send recovery requests to the server.

This mechanism does not require any participation from the subscriber. Indeed, the subscriber sees the switch to degraded mode and return to standard mode, with the recovery of the VoD. He does not participate in the recovery mechanism.

According to the embodiment, four channels are identified. Naturally, the number of channels can be different, greater or smaller. But the mechanism remains the same, the requests are sent over each channel to check the availability of each channel.

The method described in the embodiment relates to a VoD downloading session in streaming mode. Naturally, the process applies to any type of content downloading.

The invention claimed is:

1. Method for recovering a downloading session that has been interrupted, in a device comprising an interface with a network enabling access to a remote server and means for implementing a downloading session with said server, comprising the following steps at said device:
   starting up a downloading session of a content from said remote server, by means of more than one signalling channel with at least said server,
   detecting a premature interruption of the downloading session,
   verifying the availability of all the channels,
   as long as one of the channels is unavailable, the session is not recovered and if said remote server sends any request to said device in a protocol used to restore said downloading session, said device does not respond, and
   when all the channels are again available, the session is recovered.

2. Method according to claim 1, wherein the session recovery step is performed by a response to a session recovery request coming from the server.

3. Method according to claim 1, wherein the session recovery step is performed by sending a session recovery request to the server.

4. Method according to claim 1, wherein the content can be viewed during the session.

5. Method according to claim 1, wherein it applies to a video-on-demand session.

* * * * *